United States Patent [19]

Félix

[11] 4,100,574

[45] Jul. 11, 1978

[54] METHOD FOR ELECTRICALLY READING A RESISTIVE TARGET IN A CAMERA TUBE

[75] Inventor: Pierre Félix, Paris, France

[73] Assignee: Thomson-CSF, Paris, France

[21] Appl. No.: 764,650

[22] Filed: Feb. 1, 1977

[30] Foreign Application Priority Data

Feb. 6, 1976 [FR] France ............................. 76 03332

[51] Int. Cl.[2] ............................................ H04N 5/33

[52] U.S. Cl. .................................... 358/113; 250/333; 250/351

[58] Field of Search ................ 358/113, 223; 250/351, 250/333, 334

[56] References Cited

U.S. PATENT DOCUMENTS 3,774,043 11/1973 Le Carvennec ..................... 250/330

FOREIGN PATENT DOCUMENTS 2,029,876 12/1971 Fed. Rep. of Germany ....... 358/223

*Primary Examiner*—Robert L. Richardson
*Attorney, Agent, or Firm*—Roland Plottel

[57] ABSTRACT

A method for electrically reading a target such as a pyroelectric one, in a camera tube. It consists in the repetition of a sequence of three phases: reading by an electron beam scanning process, compensation by secondary electron emission and levelling of the potential of the target, the duration of each of the phases being substantially equal to the duration of an analysis line of the target. The last two phases are provided for lines preceding the line read respectively by numbers $p$ and $k$ of lines with $p<k$.

6 Claims, 6 Drawing Figures

METHOD FOR ELECTRICALLY READING A RESISTIVE TARGET IN A CAMERA TUBE

Figure 1:
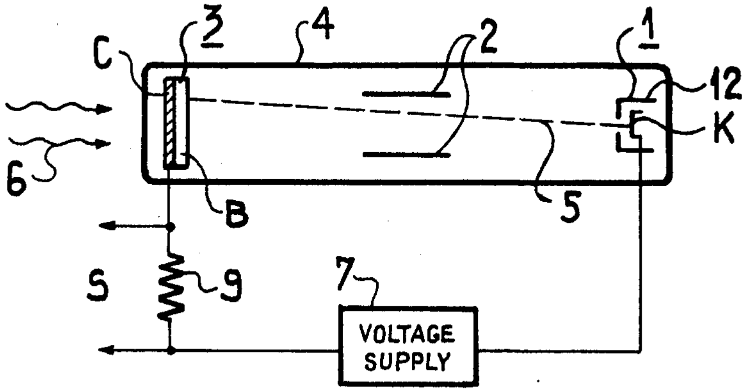

This invention relates to the field of camera tubes using a resistive target. More particularly, the invention relates to a method for electrically reading such a resistive target using a process of compensation by secondary electron emission.

One example of a resistive target is embodied in the pyroelectric targets and the following description applies to target of that kind. However, the method according to the invention may also be used for piezoelectric targets on which an acoustic image is formed.

It is known that camera tubes comprise at one end a target on which incident radiation creates a spatial temperature distribution which is converted into a spatial distribution of electrical charges. At the other end of the tube, an electron gun creates a beam which scans the target point by point along a series of parallel lines constituting a raster. This supplies an electrical signal which sequentially represents the analysis of the distribution of charges which exists on the target.

Among the various possible methods for reading the charge distribution, one method is generally used which is based on stabilisation to the cathode potential, of the potential of that surface of the target which is scanned by the beam. This method of reading is commonly known as CPS which is the abbreviation for cathode potential stabilisation. However, this method involves one difficulty, namely that the beam of electrons is no longer capable of analysing the charge distribution when the potential of that surface of the target which is scanned falls below the potential of the cathod. It is then necessary to introduce a supply of auxiliary positive charges.

Various methods are known for this purpose, including the method known as compensation by secondary electron emission. In this method, the electrons of the beam impinge on the target in a phase different from the reading phase with such energy that the coefficient of secondary emission ($\delta$) is greater than one. Nevertheless, this method is attended by a disadvantage associated with the spatial inhomogeneity of the coefficient of secondary emission, because the dark current is proportional to $(\delta-1)$ and the inhomogeneities of $\delta$ affect the basic quality of the image.

In order to obviate this disadvantage, a so-called levelling phase is normally introduced between the compensation phase and the reading phase. During this levelling phase, the potential difference between the cathode and that (metallised) surface of the target which is not subjected to the electron scanning is adjusted to a slightly negative value. The effect is to make uniform the distribution of charges over the scanned surface.

The result of this is that the levelling phase destroys the information recorded by the target. In particular, if, as is common practice, a "compensation raster-levelling raster reading raster" sequence is established, the useful signal integrated during the compensation raster and the levelling raster is destroyed at the end of the levelling raster and only the signal integrated during the reading raster can be utilised, which corresponds to a loss of two thirds of the information.

An object of the invention is to provide a method of reading by which these disadvantage may be obviated.

According to the present invention, there is provided in a camera tube for supplying an electrical signal for analysing an incident radiation, comprising an electron gun supplying a beam of electrons, means for guiding and deflecting this beam, a target having two faces, the first of said faces receiving said incident radiation and converting it into a spatial distribution of electrical charges, and means for establishing a potential difference between said gun and said target, a method for electrically reading said target, comprising the repetition of a sequence of three phases:

a phase for reading said distribution of charges by means of said electron beam which scans the second face of said target in a succession of N parallel lines forming a raster;

a compensation phase, during which the impact of said electron beam on said target gives rise to a secondary electron emission which positively polarises said second face of the target;

a levelling phase during which the impact of said electron beam on said second face of the target results in the homogenisation of said positive polarisation and during which the beam of electrons goes back in relation to the last line read by a number $k$ of lines, with $k<N$;

the duration of the reading phase being substantially equal to the duration of a line scanning and the duration of each of the levelling and compensation phases being similar, relative to the duration of the raster, to that of a reading phase, and during said compensation phase, said electron beam going back in relation to the last line read by a number $(k-p)$ of lines with $p<k$.

For a better understanding of the invention and to show how it may be carried into effect, reference will be made to the following description in conjunction with he accompanying drawings, wherein:

FIG. 1 diagrammatically illustrates a camera tube using the method according to the invention.

FIGS. 2*a* and 2*b* are diagrams showing the potential differences between target and cathode and the potential at the surface of the target during the various phases of the method according to the invention.

FIGS. 3*a*, 3*b* and 3*c* show variants of the sequence of phases of the method according to the invention.

In these various FIGS., the same elements are denoted by the same reference numerals.

FIG. 1 shows a vacuum envelope 4 and, inside this envelope, a gun 1 for the production of a beam of electrons 5. This electron gun, globally denoted by the reference 1, consists in known manner of several elements of which FIG. 1 shows only the cathode K and a Wehnelt or modulator electrode 12 for controlling the current intensity of the beam 5. The beam of electrons 5 is accelerated and directed towards a target 3 by electromagnetic means symbolised in FIG. 1 by two electrodes 2. The target 3 is formed for example by a layer B of pyroelectric material, which is sensitive to an incident radiation 6, covered by an electrically conductive layer C on that surface which is not subjected to the electron bombardment. The system shown in FIG. 1 additionally comprises a voltage supply unit 7 for applying a potential difference ($V_{CK}$) between the cathode K and the metallised surface C of the target 3.

A camera tube of the type diagrammatically illustrated in FIG. 1 operates as follows:

The incident radiation 6 impinging on the target 3 produces, in the pyroelectric material B, a spatial variation in temperature which is dependent upon the spatial energy distribution of the radiation 6. As already known, this variation in temperature in turn generates a non-uniform distribution of the positive and negative electrical charges on the two surfaces of the target 3. The beam of electrons 5 enables these charges to be neutralised and further enables an electrical reading signal S associated with the intensity of the incident radiation 6 to be collected. This signal S is extracted for example at the terminals of a resistor 9 connected in series between the gun 1 and the conductive layer C of the target 3.

As mentioned earlier on, this reading is only possible if the potential of the target is greater throughout than that of the cathode. It is therefore necessary, between two readings of one and the same point of the target, to prepare the target for its potential to be adjusted to a positive value. This preparation consists of a compensation phase and a levelling phase.

It will be recalled that, during the compensation phase ($C_1$), the potential difference $V_{CK}$ is adjusted to such a value that a secondary emission of electrons with a coefficient greater than unity is produced on the target 3 under the impact of the beam 5. In addition, the beam current is adjusted through the modulator electrode 12 to a much lower value than during the reading phase (for example to a few hundred $n$A for the phase $C_1$ and to a few $\mu$A for the reading phase). That surface of the target which is scanned by the beam (B) is then positively charged by a quantity of electricity which is proportional to the beam current, to the difference $(\delta - 1)$ between the secondary emission coefficient and one, and at the time during which the beam 5 stay on each point.

Figure 2:
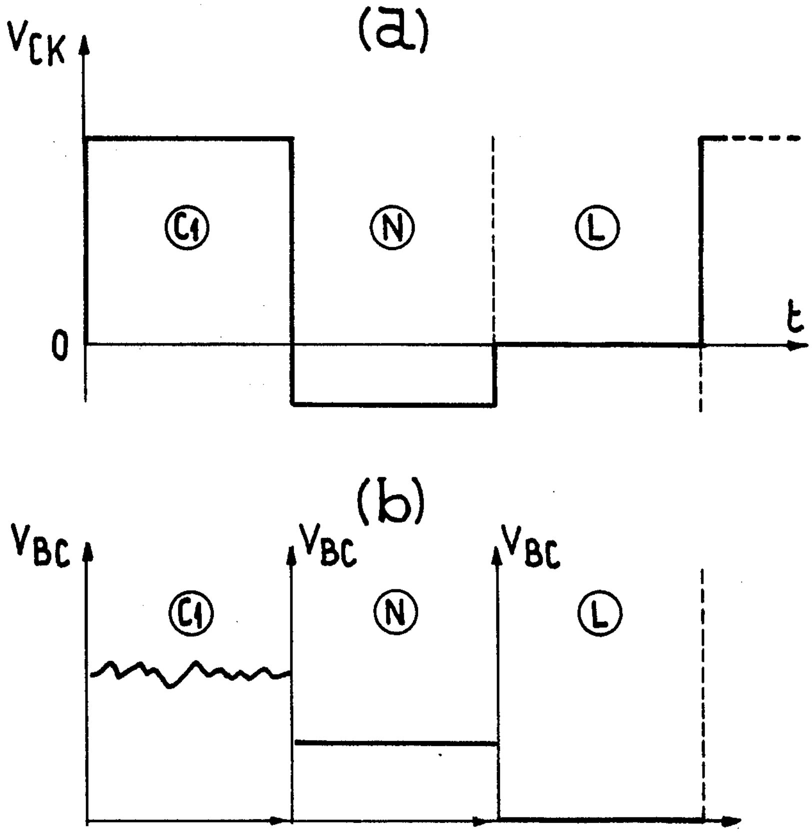

The diagrams in FIG. 2 show:

(a) the potential differences $V_{CK}$ applied (by means 7) as a function of time between the cathode K and the metallised surface C of the target;

(b) the potentials $V_{BC}$, relative to the potential of the surface C of the target, of that surface B of the target which is scanned by the beam 5.

In the compensation phase $C_1$, diagram (*a*) shows the potential difference $V_{CK}$ applied whilst diagram (*b*) shows that the surface B of the target is positively charged relative to the potential of the surface C of the target, but in a spatially non-uniform manner.

The levelling phase, which is intended to eliminate this non-uniformity, consists in adjusting the potential difference $V_{CK}$ to a slightly negative value, for example of the order of $-1$ volt. It is this which is illustrated by part N of diagram (*a*). It should be noted that, in this case: $V_{CK} = -V_{BC}$.

The electrons of the beam 5, which are then weakly accelerated towards the target 3, level the non-uniformity of the potential of the surface B when that potential assumes a value which is lower than during the compensation phase ($C_1$), but which remains positive as illustrated in diagram *b* of FIG. 2.

These two preparation phases are followed by the reading phase (part L of the diagrams in FIG. 2), during which the potential difference $V_{CK}$ is close to zero (diagram *a*) and the electrons of the beam discharge the surface B of the target (diagram *b*).

FIGS. 3*a*, 3*b* and 3*c* show variants of the sequences of the three phases of the method according to the invention.

Diagram (*a*) shows the reading of a line of order $n$ which is denoted $L_n$ and shown as a continuous line. At the end of this reading phase, there is a levelling phase during which the beam of electrons goes back by $k$ lines to scan a line of order $(n - k)$, denoted N and shown in dash-dot lines. At the end of this phase, the reading beam advances by $p$ lines (with $p < k$) to scan in the compensation phase a line of order $(n-k+p)$, denoted $C_1$ and shown in thick broken lines. Finally, after the compensation phase $C_1$, the beam advances for the following reading line of order $(n+1)$ which is shown as a continuous line and denoted $L_{n+1}$. The beam makes its various returns with a substantially zero beam current. They are shown in the Figure by thin broken lines denoted by the reference 8.

Since the duration of the various phases is equal to that of a scanning line and since the number $k$ is small by comparison with the number of lines forming the analysis raster of the target, it appears that the signal read during a reading line represents the information received by the target throughout almost the entire duration of the preceding raster. This provides for continuous visualisation and constitutes a significant advance over known systems where up to two thirds of the information received can be lost.

By way of example, for a conventional television raster, the number $k$ can vary from 10 to 60 and the number $p$ from 1 to 5.

Figure 3:
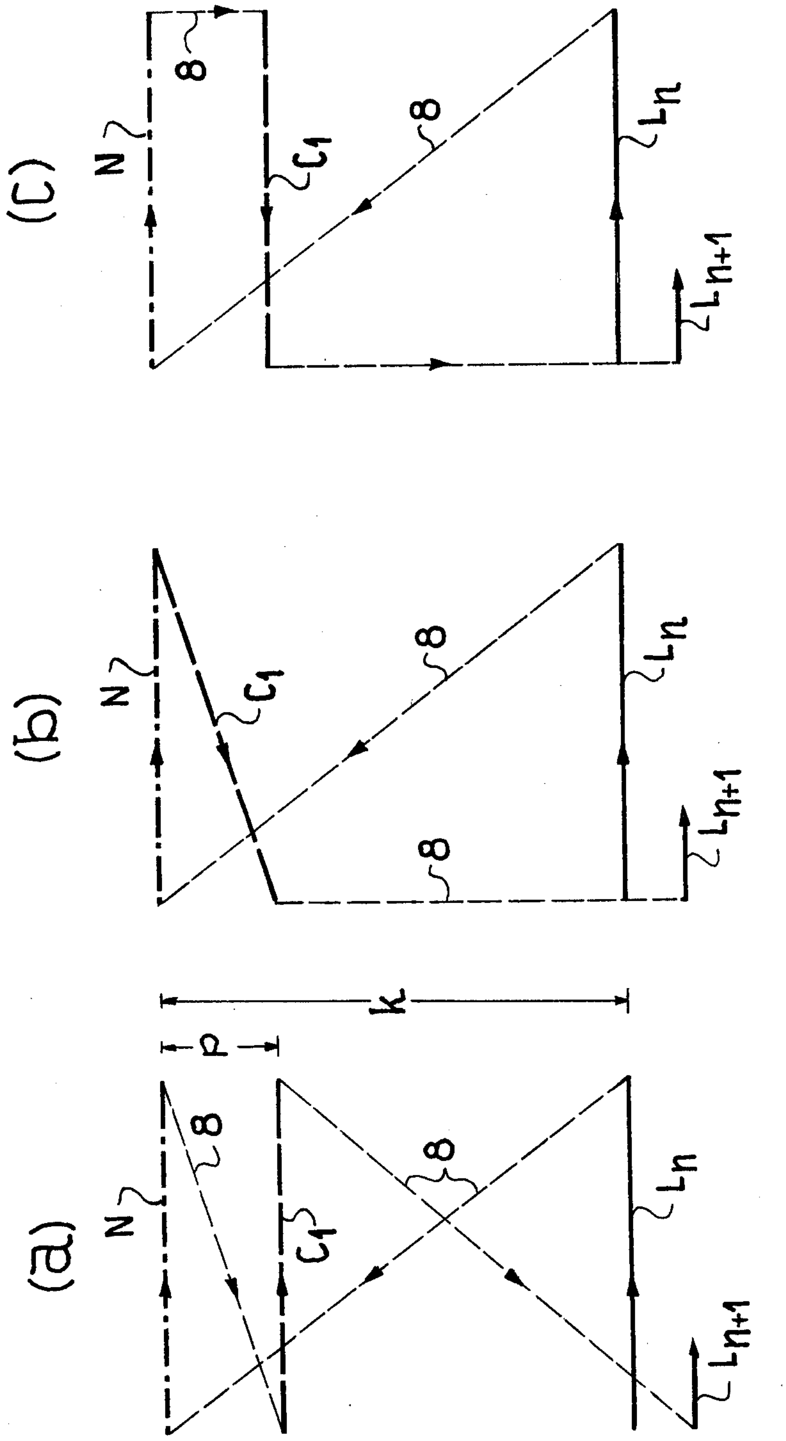

With the same conventions of illustration, diagram (*b*) of FIG. 3 shows a variant in which the compensation phase $C_1$ uses the return of the beam after the levelling N from the line of order $(n-k)$ to the line $(n-k+p)$.

Diagram (*c*) shows a variant of diagram (*a*) in which the compensation line of order $(n-k+p)$ is scanned in the opposite direction.

It should be noted that the order of the levelling and compensation phases may be reversed providing they continue to relate respectively to the lines of order $(n-k)$ and $(n-k+p)$.

Of course, the invention is not limited to the embodiment described and shown which was given solely by way of example.

What is claimed is:

1. A method of operating a camera tube of the type that supplies an electrical signal proportional to incident radiation, said camera tube having an electron gun supplying a beam of electrons, means for guiding and deflecting said beam, towards a target having two faces, the first of said faces receiving said incident radiation and converting it into a spatial distribution of electrical charges, and means for establishing a potential difference between said gun and said target, said method for electrically reading said target, comprising the repetition of a sequence of three phases:

(a). a phase for reading said distribution of charges by means of said electron beam which scans the second face of said target in a succession of N parallel lines forming a raster;

(b) a compensation phase, during which the impact of said electron beam on said target gives rise to a secondary electron emission which positively polarises said second face of the target;

(c) a levelling phase during which the impact of said electron beam on said second face of the target results in the homogenisation of said positive polarisation and during which the beam of electrons goes back in relation to the last line read by a number $k$ of lines, with $k < N$;

the duration of the reading phase being substantially equal to the duration of a line scanning and the duration of each of the levelling and compensation phases being similar; relative to the duration of the raster, to that of a reading phase; and during said compensation phase, said electron beam going back in relation to the last line read by a number $(k-p)$ of lines with $p<k$.

2. A method as claimed in claim 1, wherein the number $k$ is small by comparison with the total number N of lines forming the raster.

3. A method as claimed in claim 1, wherein the various phases are established in the following order: a reading phase, then a levelling phase and then a compensation phase, the return of the electron beam taking place with a substantially zero current.

4. A camera tube system for supplying an electrical signal analysing an incident radiation, comprising a tube having an electron gun supplying a beam of electrons, means for guiding and deflecting said beam, a target having two faces, the first of said faces receiving said incident radiation and converting it into a spatial distribution of electrical charges;

means for establishing a potential difference between said gun and said target;

means for electrically reading said target, repetitively in a sequence of three phases and controlling said beam guiding and deflecting means, with (a) a reading phase for reading said distribution of charges during which said electron beam scans the second face of said target in a succession of N parallel lines forming a raster;

(b) a compensation phase, during which said electron beam is adjusted to impact on said target giving rise to a secondary electron emission which positively polarises said second face of the target;

(c) a levelling phase during which said electron beam is adjusted to impact on said second face of the target to result in the homogenisation of said positive polarisation and during which the beam of electrons goes back in relation to the last line read by a number $k$ of lines, with $k<N$;

the duration of said reading phase being substantially equal to the duration of a line scanning, and the duration of each of the levelling and compensation phases being similar, relative to the duration of the raster, to that of a reading phase, and during said compensation phase, said electron beam going back in relation to the last line read by a number $(k-p)$ of lines with $p<k$; and wherein the number $k$ is small by comparison with the total number N of lines forming the raster.

5. In a camera tube, as claimed in claim 4, said target is of the pyroelectric type.

6. In a camera tube, as claimed in claim 4, wherein said reading means ordering said phases in the following order: a reading phase, then a levelling phase and then a compensation phase, and including means to return the electron beam with a substantially zero current.

* * * * *